United States Patent
Dahl et al.

(10) Patent No.: US 12,515,715 B2
(45) Date of Patent: *Jan. 6, 2026

(54) ACTUATOR APPARATUS WITH PRECISION BEARINGS AND LIGHT SENSOR

(71) Applicant: DTL Linear, LLC., Cody, WY (US)

(72) Inventors: David Dahl, Cody, WY (US); David E. Eichstadt, Northbrook, IL (US); Robert Charles DeBlieck, Algonquin, IL (US)

(73) Assignee: DTL Linear, LLC, Cody, WY (US)

( * ) Notice: Subject to any disclaimer, the term of this patent is extended or adjusted under 35 U.S.C. 154(b) by 883 days.

This patent is subject to a terminal disclaimer.

(21) Appl. No.: 17/742,931

(22) Filed: May 12, 2022

(65) Prior Publication Data

US 2023/0365169 A1    Nov. 16, 2023

(51) Int. Cl.
*B61K 9/02* (2006.01)
*B61B 10/02* (2006.01)
(Continued)

(52) U.S. Cl.
CPC .............. *B61K 9/02* (2013.01); *B61B 10/025* (2013.01); *B61K 7/06* (2013.01); *B61K 9/08* (2013.01);
(Continued)

(58) Field of Classification Search
CPC .... B61K 9/02; B61K 7/06; B61K 9/08; B61B 10/025; F16C 29/004; F16C 29/005;
(Continued)

(56) References Cited

U.S. PATENT DOCUMENTS 4,894,533 A    1/1990   Abe et al.
5,065,012 A    11/1991  Moriyama et al.
(Continued)

FOREIGN PATENT DOCUMENTS

CN    208474232 U    2/2019
DE    9114056 U1     11/1991
(Continued)

OTHER PUBLICATIONS

U.S. Appl. No. 18/767,594, Non-Final Office Action.
U.S. Appl. No. 18/385,546, Notice of Allowance, pp. 1-13.
U.S. Appl. No. 18/767,594, Notice of Allowance.

*Primary Examiner* — Seung C Sohn
(74) *Attorney, Agent, or Firm* — Kunzler Bean & Adamson; Bruce R. Needham

(57) ABSTRACT

An actuator apparatus includes an actuator rod with an interior cavity and a set of rod holes. Each rod hole extends through the actuator rod to the cavity. The set of rod holes is positioned in a straight line. The apparatus includes a light assembly that is positioned to light the cavity. The apparatus includes an actuator block that includes an opening extending through the actuator block sized to conform to an outer surface of the actuator rod and a set of block holes in the opening. Spacing between the block holes matches spacing between the rod holes. The actuator block includes a light sensor positioned in a block hole to sense light coming through a rod hole aligned with the block hole and a ball bearing for each block hole of the set of block holes without a light sensor and extending partially through the corresponding block hole.

20 Claims, 9 Drawing Sheets

(51) Int. Cl.
*B61K 7/06* (2006.01)
*B61K 9/08* (2006.01)
*F16C 29/00* (2006.01)

(52) U.S. Cl.
CPC .......... *F16C 29/004* (2013.01); *F16C 29/005* (2013.01); *F16C 2233/00* (2013.01); *F16C 2370/20* (2013.01)

(58) Field of Classification Search
CPC .............. F16C 2233/00; F16C 2370/20; F16C 2316/10; F16C 2322/59; F16C 27/066; F16C 31/04
See application file for complete search history.

(56) References Cited

U.S. PATENT DOCUMENTS

| | | |
|---|---|---|
| 6,145,213 A | 11/2000 | Shimano et al. |
| 6,603,640 B1 * | 8/2003 | Prater ................... F16C 19/54 |
| | | 360/264.4 |
| 8,376,381 B2 | 2/2013 | Shalaby et al. |
| 8,527,101 B2 | 9/2013 | Burris et al. |
| 8,773,237 B2 | 7/2014 | Burris et al. |
| 9,631,712 B2 | 4/2017 | Ikeda |
| 9,638,550 B2 | 5/2017 | Vokinger et al. |
| 9,869,347 B2 | 1/2018 | Fujioka |
| 10,837,532 B2 * | 11/2020 | Kwaśniewski ..... F16H 25/2204 |
| 12,031,851 B2 | 7/2024 | Dahl et al. |
| 2002/0070334 A1 | 6/2002 | Hasegawa et al. |
| 2002/0088933 A1 | 7/2002 | Yu et al. |
| 2004/0256546 A1 | 12/2004 | Hsiao et al. |
| 2011/0252598 A1 | 10/2011 | Burris et al. |
| 2017/0292543 A1 | 10/2017 | Nikolic |
| 2021/0325209 A1 | 10/2021 | Baker |
| 2022/0065667 A1 | 3/2022 | Ueno et al. |
| 2022/0187104 A1 | 6/2022 | Parpajola |

FOREIGN PATENT DOCUMENTS

| | | |
|---|---|---|
| DE | 19619113 A1 | 5/1996 |
| EP | 2459969 B1 | 7/2010 |
| JP | 60113110 A | 11/1983 |
| JP | 6173004 A | 9/1984 |
| WO | 9704286 A1 | 2/1997 |

* cited by examiner

Section A-A'

ACTUATOR APPARATUS WITH PRECISION BEARINGS AND LIGHT SENSOR

FIELD

This invention relates to tracking movement and more particularly relates to an actuator apparatus with precision bearings and light sensor.

BACKGROUND

Often robotics, assembly lines, medical procedures, etc. require precise movement. Many approaches have been used for tracking movement for precise placement of various devices and for other purposes.

SUMMARY

An actuator apparatus with precision bearings and light sensor includes an actuator rod with an interior cavity and a set of rod holes. Each rod hole of the set of rod holes extends through the actuator rod to the cavity. The set of rod holes is positioned in a straight line. The apparatus includes a light assembly that is positioned to light the cavity. The apparatus includes an actuator block that includes an opening extending through the actuator block sized to conform to an outer surface of the actuator rod and a set of block holes in the opening. Spacing between the block holes matches spacing between the rod holes. The actuator block includes a light sensor positioned in a block hole of the set of block holes to sense light coming through a rod hole aligned with the block hole and a ball bearing for each block hole of the set of block holes without a light sensor and extending partially through the corresponding block hole.

A system with an actuator apparatus with precision bearings and light sensor includes an actuator rod with an interior cavity and a set of rod holes. Each rod hole of the set of rod holes extends through the actuator rod to the cavity. The set of rod holes are positioned in a straight line. The system includes a light assembly positioned to light the cavity and an actuator block. The actuator block includes an opening extending through the actuator block sized to conform to an outer surface of the actuator rod, a set of block holes in the opening. Spacing between the block holes matches spacing between the rod holes, a light sensor positioned in a block hole of the set of block holes to sense light coming through a rod hole aligned with the block hole, a ball bearing for each block hole of the set of block holes without a light sensor and extending partially through the corresponding block hole, and a spring mechanism behind each ball bearing pushing the ball bearing toward the opening. As the actuator block moves relative to the actuator rod and rod holes align with block holes, each ball bearing extends into a rod hole.

The system includes a hole counter module configured to increment or decrement a hole counter in response to the light sensor sensing light during alignment of a rod hole with a block hole. The system includes a mover apparatus configured to move the actuator block with respect to the actuator rod in a direction such that lines connecting each rod hole of the set of rod holes maintain alignment with lines connecting each block hole of the set of block holes. The system includes a direction detector configured to determine a direction of movement of the actuator block with respect to the actuator rod. The hole counter module increments the hole counter in response to the light sensor sensing light and the direction detector determining that the actuator block is moving in a first direction with respect to the actuator rod and the hole counter module decrements the hole counter in response to the light sensor sensing light and the direction detector determining that the actuator block is moving in a second direction with respect to the actuator rod, the second direction opposite the first direction.

Another actuator apparatus with precision bearings and light sensor includes an actuator rod with an interior cavity and a plurality of sets of rod holes. Each rod hole extends through the actuator rod to the cavity. Each set of rod holes is positioned in a straight line along a length of the actuator rod. The sets of rod holes are spaced evenly around a circumference of the actuator rod. The apparatus includes a light assembly positioned to light the cavity and an actuator block. The actuator block includes an opening extending through the actuator block sized to conform to an outer surface of the actuator rod, and a plurality of sets of block holes in the opening. Spacing between the block holes matches spacing between the rod holes and each set of block holes aligned with a set of rod holes in a direction along the length of the actuator rod. The actuator block includes a plurality of light sensors with a light sensor for each set of block holes. The light sensor for a set of block holes is positioned in a block hole of the set of block holes to sense light coming through a rod hole aligned with the block hole.

The actuator apparatus includes a ball bearing for each block hole of each of the sets of block holes without a light sensor that extends partially through the corresponding block hole, and a spring mechanism behind each ball bearing pushing the ball bearing toward the opening. As the actuator block moves relative to the actuator rod and rod holes align with block holes, each ball bearing extends into a rod hole. The apparatus includes a hole counter module configured to increment or decrement a hole counter in response to a light sensor of the plurality of light sensors sensing light during alignment of a rod hole with a block hole.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
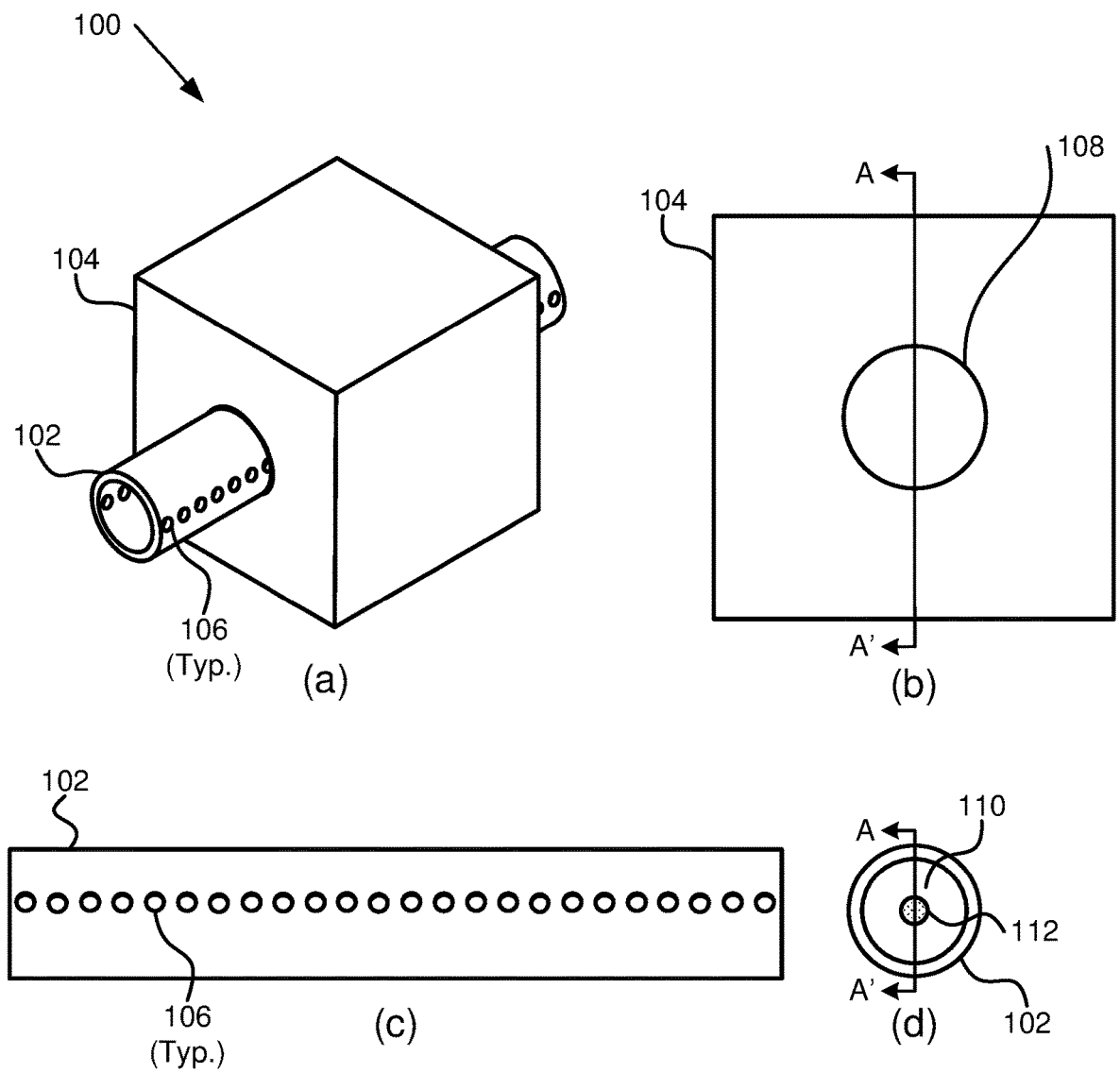
FIG. 1 is (a) an actuator apparatus perspective view, (b) an actuator block end view, (c) an actuator rod side view, and (d) an actuator rod end view illustrating a schematic block diagram of an actuator apparatus with precision bearings and light sensors, according to various embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system and/or apparatus with controls embodied as a method or computer program product. Accordingly, aspects of controls for the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the controls for the present invention may take the form of a computer program product embodied in one or more computer readable medium(s) having program code embodied thereon.

Many of the functional units for the controls described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module. Indeed, a module of program code may be a single instruction, or many instructions, and may even be distributed over several different code segments, among different programs, and across several memory devices. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

An actuator apparatus with precision bearings and light sensor includes an actuator rod with an interior cavity and a set of rod holes. Each rod hole of the set of rod holes extends through the actuator rod to the cavity. The set of rod holes is positioned in a straight line. The apparatus includes a light assembly that is positioned to light the cavity. The apparatus includes an actuator block that includes an opening extending through the actuator block sized to conform to an outer surface of the actuator rod and a set of block holes in the opening. Spacing between the block holes matches spacing between the rod holes. The actuator block includes a light sensor positioned in a block hole of the set of block holes to sense light coming through a rod hole aligned with the block hole and a ball bearing for each block hole of the set of block holes without a light sensor and extending partially through the corresponding block hole.

In some embodiments, the set of rod holes is a first set of rod holes, and the set of block holes is a first set of block holes, and the apparatus includes one or more additional sets of rod holes. The first set of rod holes and the one or more additional sets of rod holes are a plurality of sets of rod holes and are spaced equidistant around the actuator rod. In the embodiments, the apparatus includes one or more additional sets of block holes. The first set of block holes and the one or more additional sets of block holes are a plurality of sets of block holes and are spaced equidistant around the opening to align with the sets of rod holes of the plurality of sets of rod holes. In the embodiments, the apparatus includes a light sensor for each of the additional sets of block holes, each positioned in a block hole, and each block hole of the one or more additional sets of block holes without a light sensor includes a ball bearing.

In other embodiments, the rod holes of each of the one or more additional sets of rod holes is offset from the rod holes of the first set of rod holes and from each other in a direction along the first set of rod holes and each block hole of the one or more additional sets of block holes aligns with a block hole of the first set of block holes in a plane running perpendicular to a direction of the first set of block holes such that as the actuator block moves with respect to the actuator rod, rod holes of each of the plurality of sets of rod holes align with block holes at different times. In other embodiments, the block holes of the one or more additional sets of block holes is offset from the block holes of the first set of block holes and from each other in a direction of the first set of block holes and each rod hole of the one or more additional sets of rod holes aligns with a rod hole of the first set of rod holes in a plane running perpendicular to a direction of the first set of rod holes such that as the actuator block moves with respect to the actuator rod, rod holes of each of the plurality of sets of rod holes align with block holes at different times.

In other embodiments, the rod holes of each of the one or more additional sets of rod holes align with each other and the first set of rod holes in a direction of a plane running perpendicular to a direction along the first set of rod holes and the block holes of each of the one or more additional sets of block holes align with each other and block holes of the first set of block holes in a direction of a plane running perpendicular to a direction along the first set of block holes such that the rod holes of the first set of rod holes and the one or more additional sets of rod holes align with block holes of the first set of block holes and each of the one or more additional sets of block holes at a same time.

In some embodiments, the apparatus includes a spring mechanism behind each ball bearing pushing the ball bearing toward the opening where, as the actuator block moves relative to the actuator rod and rod holes align with block holes, each ball bearing extends into a rod hole. In other embodiments, the apparatus includes a hole counter module configured to increment or decrement a hole counter in response to the light sensor sensing light during alignment of a rod hole with a block hole. In further embodiments, the apparatus includes a direction detector configured to determine a direction of movement of the actuator block with respect to the actuator rod. The hole counter module increments the hole counter in response to the light sensor sensing light and the direction detector determining that the actuator block is moving in a first direction with respect to the actuator rod and the hole counter module decrements the hole counter in response to the light sensor sensing light and the direction detector determining that the actuator block is moving in a second direction with respect to the actuator rod. The second direction is opposite the first direction.

In some embodiments, the apparatus includes a mover apparatus configured to move the actuator block with respect to the actuator rod in a direction such that lines connecting each rod hole of the set of rod holes maintain alignment with lines connecting each block hole of the set of block holes. In other embodiments, the mover apparatus moves the actuator block along the actuator rod or the mover apparatus moves the actuator rod through the actuator block. In other embodiments, where the mover apparatus moves the actuator block along the actuator rod, the actuator rod is in a fixed position. In other embodiments, the mover apparatus includes an internal mover within the actuator block configured to engage the actuator rod, a separate mover component external to the actuator block configured to move the actuator block with respect to the actuator rod, and/or a linear motor configured to move the actuator block with respect to the actuator rod magnetically.

In other embodiments, the mover apparatus is configured to maintain the actuator rod in alignment with the actuator block such that lines connecting each rod hole of the set of rod holes maintain alignment with lines connecting each block hole of the set of block holes. In other embodiments, the mover apparatus comprises free movement in a direction of movement of the actuator block with respect to the actuator rod. The free movement enables ball bearings positioned in block holes without a sensor to snap forward from one set of rod holes to another set of rod holes as the mover apparatus advances the actuator block with respect to the actuator rod.

In some embodiments, a shape of the actuator rod and a shape of the opening of the actuator block maintain the actuator rod in alignment with the actuator block such that lines connecting each rod hole of the set of rod holes maintain alignment with lines connecting each block hole of the set of block holes. In other embodiments, the actuator rod is linear and the rod holes run in a direction along a length of the actuator rod and the actuator block moves with respect to the actuator rod in a direction along the length of the actuator rod. In other embodiments, the actuator rod is round and the rod holes run in a direction around a circumference of the actuator rod and the actuator block rotates with respect to the actuator rod in a direction around the circumference of the actuator rod.

In some embodiments, the apparatus includes a bearing track within the actuator block between block holes. The actuator block includes ball bearings within the bearing track in excess of the block holes of the set of block holes. In the embodiments, the apparatus includes a bearing mover configured to move the ball bearings in the bearing track such that, for each block hole in the actuator block, a ball bearing in a block hole is moved out from over the block hole of the block hole and another ball bearing is moved into place over the block hole by action of the bearing mover.

A system with an actuator apparatus with precision bearings and light sensor includes an actuator rod with an interior cavity and a set of rod holes. Each rod hole of the set of rod holes extends through the actuator rod to the cavity. The set of rod holes are positioned in a straight line. The system includes a light assembly positioned to light the cavity and an actuator block. The actuator block includes an opening extending through the actuator block sized to conform to an outer surface of the actuator rod, a set of block holes in the opening. Spacing between the block holes matches spacing between the rod holes, a light sensor positioned in a block hole of the set of block holes to sense light coming through a rod hole aligned with the block hole, a ball bearing for each block hole of the set of block holes without a light sensor and extending partially through the corresponding block hole, and a spring mechanism behind each ball bearing pushing the ball bearing toward the opening. As the actuator block moves relative to the actuator rod and rod holes align with block holes, each ball bearing extends into a rod hole.

The system includes a hole counter module configured to increment or decrement a hole counter in response to the light sensor sensing light during alignment of a rod hole with a block hole. The system includes a mover apparatus configured to move the actuator block with respect to the actuator rod in a direction such that lines connecting each rod hole of the set of rod holes maintain alignment with lines connecting each block hole of the set of block holes. The system includes a direction detector configured to determine a direction of movement of the actuator block with respect to the actuator rod. The hole counter module increments the hole counter in response to the light sensor sensing light and the direction detector determining that the actuator block is moving in a first direction with respect to the actuator rod and the hole counter module decrements the hole counter in response to the light sensor sensing light and the direction detector determining that the actuator block is moving in a second direction with respect to the actuator rod, the second direction opposite the first direction.

Another actuator apparatus with precision bearings and light sensor includes an actuator rod with an interior cavity and a plurality of sets of rod holes. Each rod hole extends through the actuator rod to the cavity. Each set of rod holes is positioned in a straight line along a length of the actuator rod. The sets of rod holes are spaced evenly around a circumference of the actuator rod. The apparatus includes a light assembly positioned to light the cavity and an actuator block. The actuator block includes an opening extending through the actuator block sized to conform to an outer surface of the actuator rod, and a plurality of sets of block holes in the opening. Spacing between the block holes matches spacing between the rod holes and each set of block holes aligned with a set of rod holes in a direction along the length of the actuator rod. The actuator block includes a plurality of light sensors with a light sensor for each set of block holes. The light sensor for a set of block holes is positioned in a block hole of the set of block holes to sense light coming through a rod hole aligned with the block hole.

The actuator apparatus includes a ball bearing for each block hole of each of the sets of block holes without a light sensor that extends partially through the corresponding block hole, and a spring mechanism behind each ball bearing pushing the ball bearing toward the opening. As the actuator block moves relative to the actuator rod and rod holes align with block holes, each ball bearing extends into a rod hole. The apparatus includes a hole counter module configured to increment or decrement a hole counter in response to a light sensor of the plurality of light sensors sensing light during alignment of a rod hole with a block hole.

In some embodiments, each set of rod holes of the plurality of sets of rod holes is offset from other sets of rod holes of the plurality of rod holes in a direction along the length of the actuator rod and each set of block holes of the plurality of sets of block holes aligns with other sets of block holes of the plurality of block holes in a direction around a circumference of the actuator rod, or each set of block holes of the plurality of sets of block holes is offset from other sets of block holes of the plurality of block holes in a direction along the length of the actuator rod and each set of rod holes of the plurality of sets of rod holes aligns with other sets of rod holes of the plurality of rod holes in a direction around a circumference of the actuator rod, such that as the actuator block moves with respect to the actuator rod, rod holes of a first set of rod holes of the plurality of rod holes align with corresponding block holes at a different time than rod holes of other sets of rod holes align with corresponding block holes.

Figure 2:
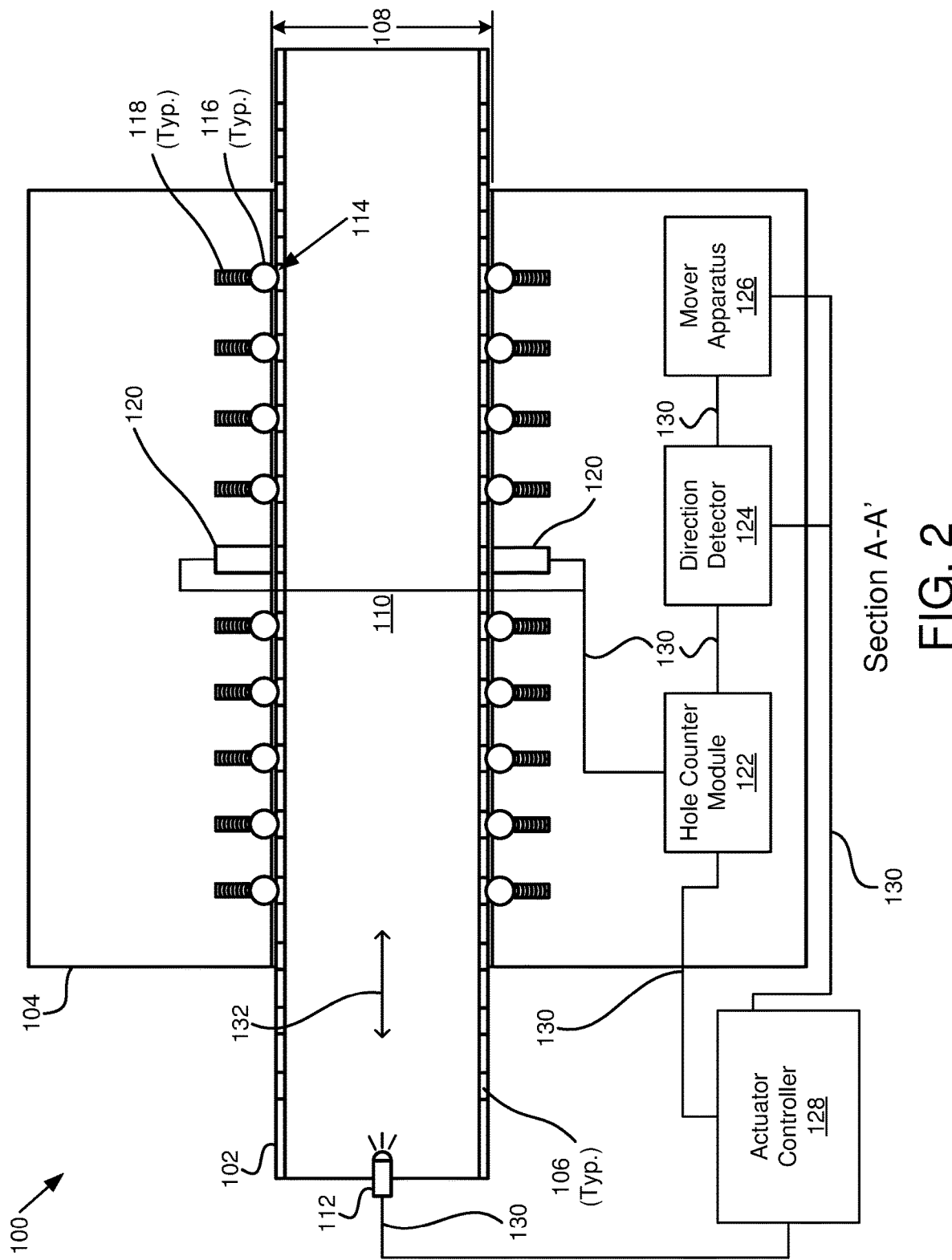
FIG. 2 is a section view further illustrating the schematic block diagram of the actuator apparatus of FIG. 1.

FIG. 1 is (a) an actuator apparatus perspective view, (b) an actuator block end view, (c) an actuator rod side view, and (d) an actuator rod end view illustrating a schematic block diagram of an actuator apparatus 100 with precision bearings and light sensors, according to various embodiments. FIG. 2 is a section view A-A' further illustrating the schematic block diagram of the actuator apparatus 100 of FIG. 1. The actuator apparatus 100 includes an actuator rod 102 with an interior cavity 110 and a set of rod holes 106. Each rod hole 106 of the set of rod holes 106 extends through the actuator rod 102 to the cavity 110. The set of rod holes 106 are positioned in a straight line.

The actuator apparatus 100 includes a light assembly 112 positioned to light the cavity 110. Light from the light assembly 112 shines through the rod holes 106 because the rod holes 106 extend through the actuator rod 102 into the cavity 110. In some embodiments, the light assembly 112 includes a point source at an end of the actuator rod 102. In other embodiments, the light assembly 112 is located further inside the cavity 110 of the actuator rod 102. In other embodiments, the light assembly 112 includes multiple light sources, such as light emitting diodes ("LEDs"). In other embodiments, the multiple light sources are spread out within the actuator rod 102. In other embodiments, the light assembly 112 is located in the actuator block opposite from a light sensor 120 and the actuator rod 102 includes rod holes 106 on either side that align to allow light from the light assembly 112 in on one side of the actuator block 104 to shine across to the light sensor 120 through two aligned rod holes 106. One of skill in the art will recognize other configurations for the light assembly 112 and other locations for part or all of the light assembly 112.

The actuator block 104 includes an opening 108 that extends through the actuator block 104 and is sized to conform to an outer surface of the actuator rod 102. The actuator rod 102 in the actuator apparatus 100 of FIG. 1 is round so the opening 108 is also round. In other embodiments, the actuator rod 102 has a different shaped cross section, such as an oval, square, rectangle, etc. and the opening 108 is similarly shaped and is slightly larger than an outer shape of the actuator rod 102 so that the actuator rod 102 is able to pass through the opening 108. An actuator rod 102 shaped differently than with a round cross section, in some embodiments, provides a mechanism to maintain the actuator rod 102 and actuator block 104 in a same alignment while the actuator rod 102 passes through the actuator block 104. In some embodiments, the actuator rod 102 and opening 108 in the actuator block 104 include a protrusion and corresponding groove, a key and a corresponding channel, or the like to keep the actuator rod 102 and actuator block 104 in alignment as the actuator rod 102 passes through the actuator block 104.

Figure 3:
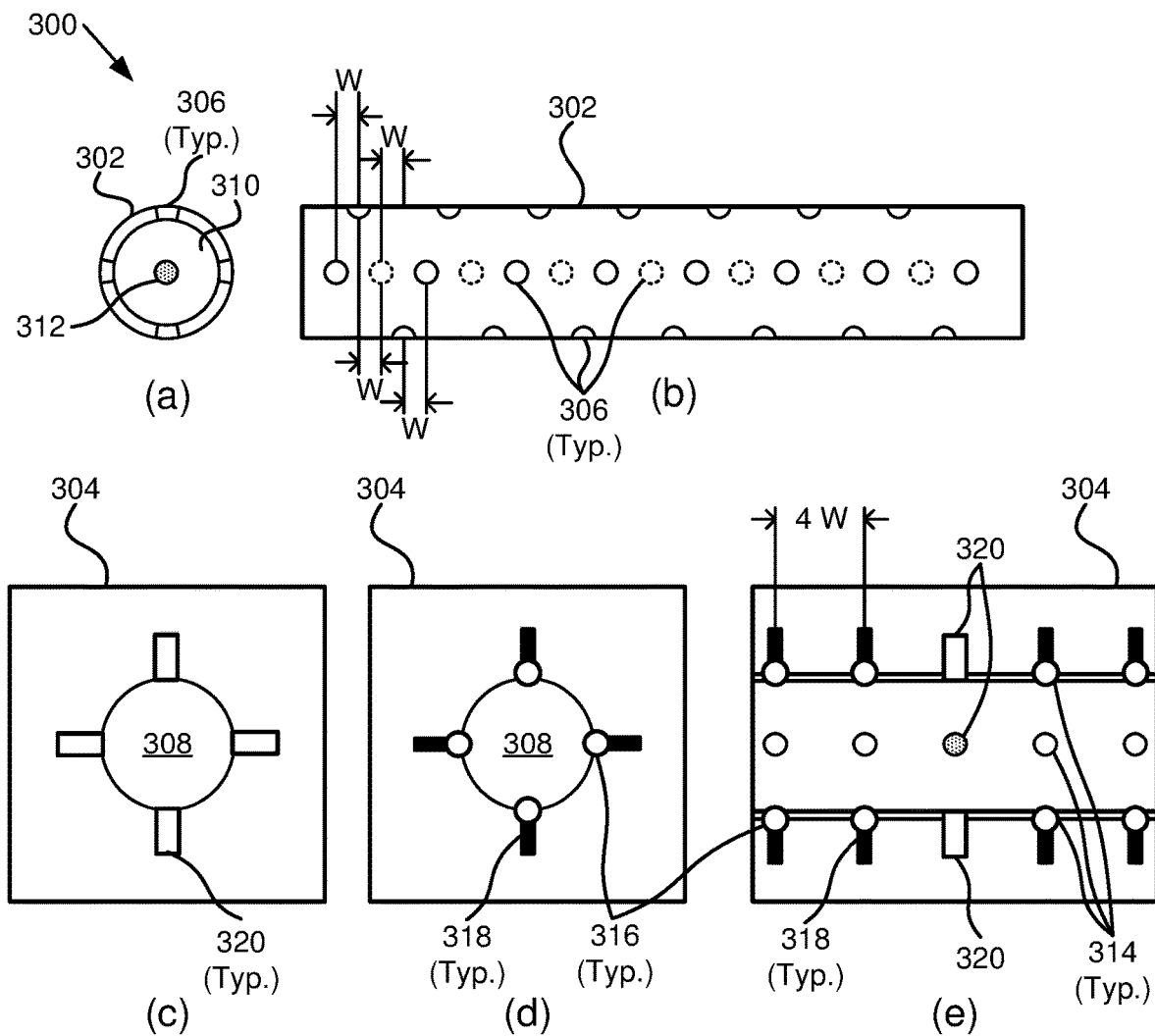
FIG. 3 is (a) an actuator rod end view, (b) an actuator rod side view, (c) an actuator block section view through light sensors, (d) an actuator block section view through ball bearings and springs, and (e) an actuator block side section view illustrating a schematic block diagram of an actuator apparatus with precision bearings and light sensors in four rows spaced around an actuator rod and opening in an actuator block with offset rod holes, according to various embodiments.
Figure 4:
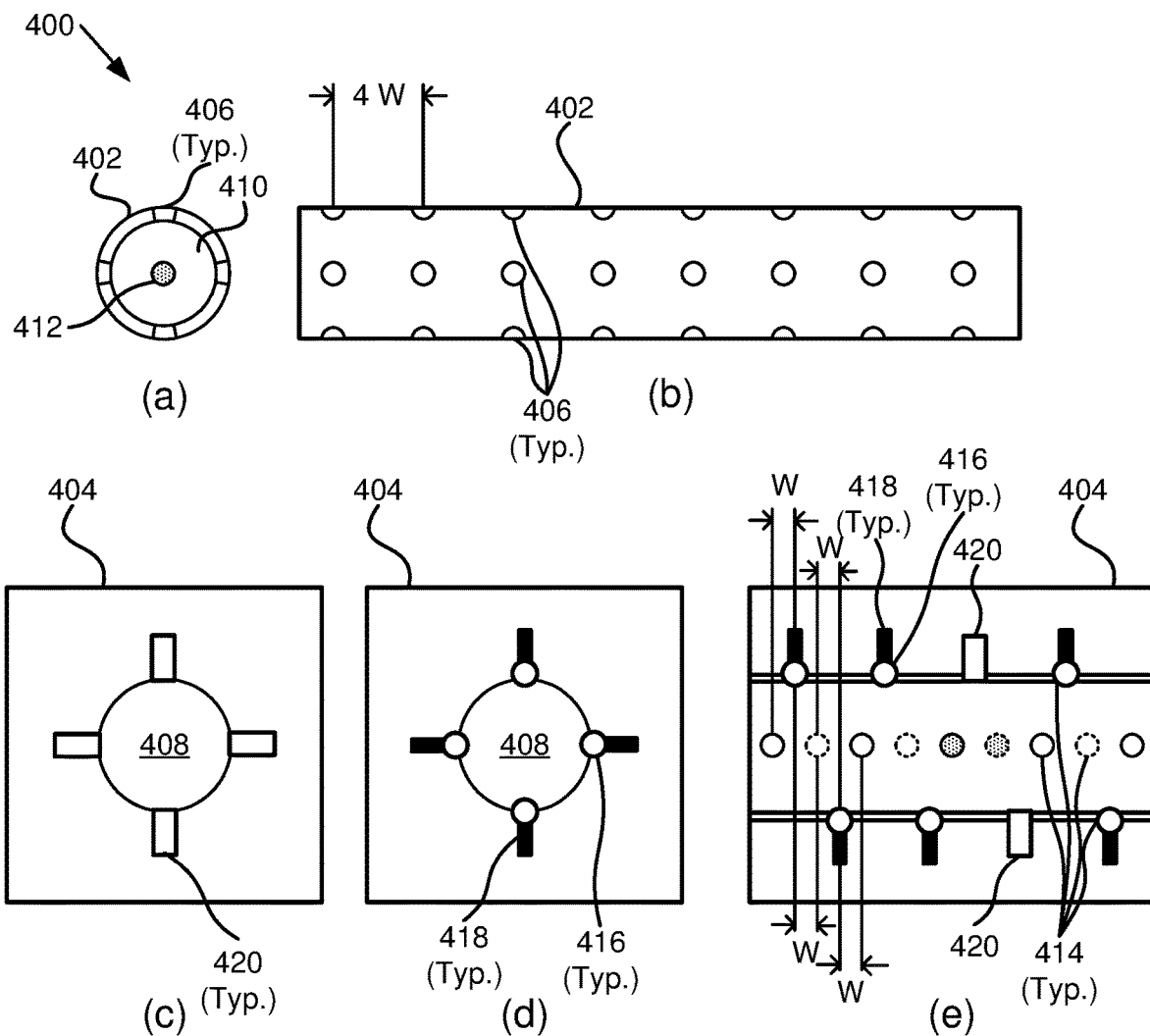
FIG. 4 is (a) an actuator rod end view, (b) an actuator rod side view, (c) an actuator block section view through light sensors, (d) an actuator block section view through ball bearings and springs, and (e) an actuator block side section view illustrating a schematic block diagram of an actuator apparatus with precision bearings and light sensors in four rows spaced around an actuator rod and opening in an actuator block with offset block holes, according to various embodiments.
Figure 5:
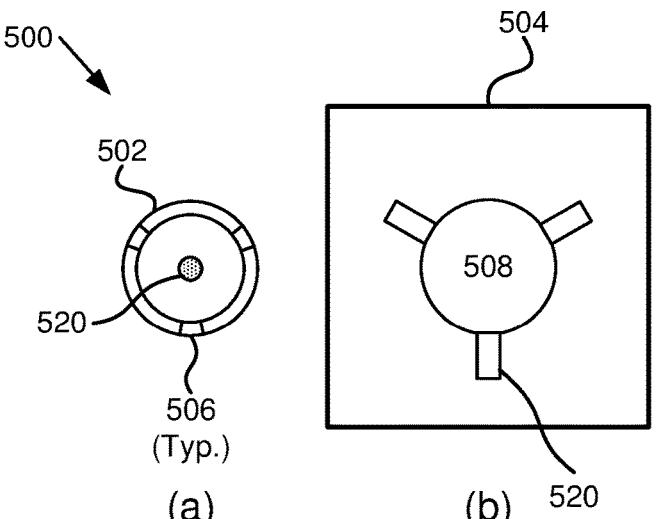
FIG. 5 is (a) an actuator rod end view, and (b) an actuator block section view through light sensors illustrating a schematic block diagram of an actuator apparatus with precision bearings and light sensors in three rows spaced around an actuator rod and opening in an actuator block, according to various embodiments.

The actuator block 104 includes two sets of block holes 114 in the opening 108. Other embodiments include one set of block holes 114 or more than two sets of block holes 114, as depicted in FIGS. 3-5. Spacing between the block holes 114 matches spacing between the rod holes 106. The actuator block 104 includes a light sensor 120 positioned in a block hole 114 of each of the sets of block holes 114 to sense light coming through a rod hole 106 aligned with the block hole 114. In other embodiments, the actuator block 104 includes sets of block holes 114 without a light sensor 120 which are used to reduce friction, used for alignment, etc. For example, the actuator block 104 may include four sets of block holes 114 and the actuator rod 102 also includes four sets of rod holes 106 aligned with the block holes 114 and only a single set of block holes 114 includes a light sensor 120. One of skill in the art will recognize other configurations with multiple sets of rod holes 106 and corresponding block holes 114 in an actuator rod 102 where one or more of the sets of block holes 114 include a light sensor 120.

In some embodiments, the actuator apparatus 100 includes a hole counter module 122 configured to increment or decrement a hole counter in response to the light sensor 120 sensing light during alignment of a rod hole 106 with a block hole 114. In some embodiments, the hole counter module 122 includes a zeroing function that resets the hole counter to zero. In some examples, the zeroing function zeros out the hole counter when the actuator rod 102 is in a particular position with respect to the actuator block 104. In other embodiments, the zeroing function zeros out the hole counter before the actuator rod 102 is inserted into the actuator block 104. One of skill in the art will recognize other times for the zeroing function to zero out the hole counter.

In some embodiments, the actuator apparatus 100 includes a direction detector 124 configured to determine a direction of movement of the actuator block 104 with respect to the actuator rod 102. The hole counter module 122 increments the hole counter in response to the light sensor 120 sensing light and the direction detector 124 determining that the actuator block 104 is moving in a first direction with respect to the actuator rod 102 and the hole counter module 122 decrements the hole counter in response to the light sensor 120 sensing light and the direction detector 124 determining that the actuator block 104 is moving in a second direction with respect to the actuator rod 102 where the second direction opposite the first direction.

In some embodiments, the size of the rod holes 106 and block holes relative to spacing between each of the rod holes 106, spacing between each of the block holes 114, and/or a size of a gap between the actuator rod 102 and opening 108 are configured so that the one or more light sensors 120 detect light from the light assembly 112 when a rod hole 106 aligns with a block hole 114 and do not detect light from the light assembly 112 with a rod hole 106 not aligned with a block hole 114. In some embodiments, the light sensor 120 typically begins to sense light just before alignment and/or upon partial alignment of the rod holes 106 and block holes 114 and light intensity reaches a peak upon full alignment. Typically, as a rod hole 106 passes a block hole 114, light intensity will increase to a peak value and then decrease to zero or at least to a minimum value. In some embodiments, the hole counter module 122 registers alignment of a rod hole 106 with a block hole 114 when light intensity sensed by the light sensors 120 reaches a light threshold.

The actuator block 104 includes a ball bearing 116 for each block hole 114 of the set of block holes without a light sensor 120 that extends partially through the corresponding block hole 114. The size of the opening 108 in the actuator block 104 relative to the actuator rod 102 along with the size of the block holes 114 and the ball bearings 116 are such that, for each ball bearing 116 of the actuator block 104, the ball bearing 116 extend partially into a rod hole 106 when the rod hole 106 is aligned with the block hole 114 from which the ball bearing 116 extends.

Figure 10A:
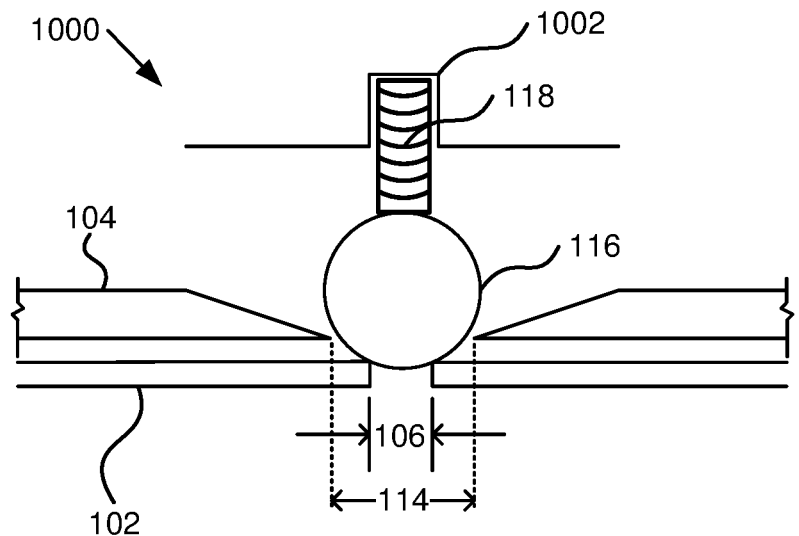
FIG. 10A is a schematic block diagram illustrating a ball bearing and spring mechanism, according to various embodiments.

The actuator block 104 includes a spring mechanism 118 behind each ball bearing 116 pushing the ball bearing 116 toward the opening 108. As the actuator block 104 moves relative to the actuator rod 102 and rod holes 106 align with block holes 114, each ball bearing 116 extends into a rod hole 106. As the actuator block 104 moves further relative to the actuator rod 102, the ball bearings 116 retract slightly and then extend into a next rod hole 106. In some embodiments, where the actuator rod 102 extends through the opening 108 past a point where rod holes 106 exist, the ball bearings 116 extend to a point where edges of the corresponding block hole 114 retain the ball bearing 116 from popping out of the block hole 114. A possible configuration is depicted in FIG. 10A.

The spring mechanism 118, in some embodiments, is a linear spring. In other embodiments, the spring mechanism 118 includes a spring in another form, such as an extension spring, a torsion spring, or the like. In some embodiments, the spring mechanism 118 is a coil spring, a flat spring, a leaf spring, a molded spring, a Belleville spring, or the like. In other embodiments, the spring mechanism 118 includes other elements, such as a sleeve, an end cap on the sleeve, or the like to keep the spring aligned with the corresponding block hole 114, from keeping the spring from popping out when a ball bearing 116 is not present over the block hole 114, etc. In other embodiments, the spring mechanism 118 includes another device that provides a spring force that is not a metal, such as a compressible rubber, or the like.

Figure 10B:
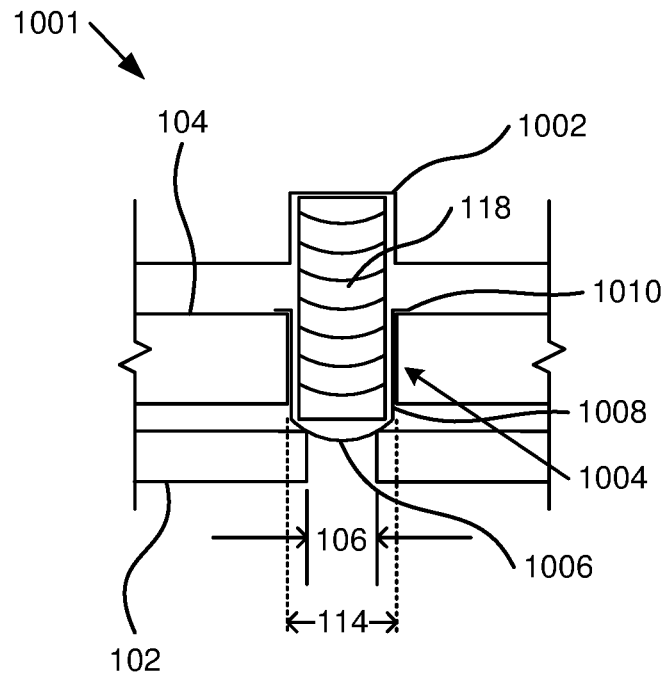
FIG. 10B is a schematic block diagram illustrating a ball bearing and spring mechanism with an alternate to using a ball bearing, according to various embodiments.

While the ball bearing 116 and spring mechanism 118 are depicted in FIG. 2 as a round ball and a spring behind the round ball, other embodiments include other designs. In some embodiments, the ball bearing 116/spring mechanism 118 include a sleeve with a cap with a spring in the sleeve where the sleeve extends through a corresponding block hole 114 towards the actuator rod 102. In some examples, the cap of a sleeve is rounded at least in a direction of movement of the actuator rod 102 to provide smooth movement of the actuator rod 102 without a sleeve and cap from catching in a rod hole 106, as depicted in FIG. 10B.

The ball bearings 116 extending into rod holes 106 provides a mechanism for the actuator rod 102 to move to a stable location during light sensing when ball bearings 116 are resting in rod holes 106, and then to move along to next rod holes 106 as the actuator block 104 moves with respect to the actuator rod 102. The ball bearings 116 provide a mechanism to allow movement of the actuator rod 102 with respect to the actuator block 104 in a precise way while discretely moving from rod hole 106 to rod hole 106.

The actuator apparatus 100, in some embodiments, includes a mover apparatus 126 configured to move the actuator block 104 with respect to the actuator rod 102 in a direction such that lines connecting each rod hole 106 of the set of rod holes 106 maintain alignment with lines connecting each block hole 114 of the set of block holes 114. For the actuator apparatus 100 of FIGS. 1 and 2, the actuator rod 102 moves through the actuator block 104 along a length of the actuator rod 102 as indicted by the arrow 132 in FIG. 2. In some embodiments, the actuator rod 102 is fixed and the mover apparatus 126 moves the actuator block 104. In other embodiments, the actuator block 104 is fixed and the mover apparatus 126 moves the actuator rod 102. In other embodiments, the mover apparatus 126 moves both the actuator rod 102 and the actuator block 104.

The mover apparatus 126, in some embodiments, is located in the actuator block 104. In some examples, the mover apparatus 126 includes wheels, gears, etc. to move the actuator block 104 from within the actuator block 104. In other embodiments, the mover apparatus 126 is external to the actuator block and/or actuator rod 102. In some examples, the mover apparatus 126 includes a gear drive, a worm drive, a pneumatic drive, a chain drive, a linear motor, or any other powered mechanism to move the actuator rod 102 with respect to the actuator block 104.

In some embodiments, the direction detector 124 is connected to the mover apparatus 126 and receives or derives a direction of the actuator rod 102 with respect to the actuator block 104 from the mover apparatus 126. In other embodiments, the direction detector 124 is in the mover apparatus 126. In other embodiments, the direction detector 124 is a signal from the mover apparatus 126. One of skill in the art will recognize other implementations of the direction detector 124 and/or other ways for the direction detector 124 to derive a direction signal.

In some embodiments, the mover apparatus 126 is controlled by an actuator controller 128. The actuator controller 128 is depicted external to the actuator block 104 but may be internal to the actuator block 104. In some embodiments, the actuator controller 128 includes controls, which may be levers, buttons, keys, a display, or other device for a person to control the actuator apparatus. In other embodiments, the actuator controller 128 is controlled by signals from other controls, such as a robotic controller that controls one or more robotic arms, movers, etc. attached to the actuator block 104 and/or actuator rod 102. In other embodiments, the actuator apparatus 100 is part of an assembly process or other process and the actuator controller 128 is controlled by or is part of a controller for the process. In some embodiments, the actuator controller 128 is connected to the hole counter module 122, the direction detector 124, the mover apparatus 126, the light assembly 112, the light sensors 120, and/or other component, which may be connected via wiring 130 or other conductors, and uses information from the direction detector 124, hole counter module 122, and other sources to control the mover apparatus 126. One of skill in the art will recognize other implementations of an actuator controller 128.

In some embodiments, the mover apparatus 126 facilitates manual movement of the actuator block 104 with respect to the actuator rod 102. In some examples, the mover apparatus 126 includes handles, buttons, grips, etc. to allow a user to move the actuator block 104 with respect to the actuator rod 102. For example, the actuator apparatus 100 may be used in a medical process and a surgeon manually moves the actuator rod 102 with respect to the actuator block 104 for precise placement of a medical device, for precise movement of a scalpel, scissors, etc. One of skill in the art will recognize other uses for the actuator apparatus 100.

As used herein, the phrasing of "the actuator rod 102 moving with respect to the actuator block 104" means the same as the phrasing of "the actuator block 104 moving with respect to the actuator rod 102" and each phrasing is intended only to convey movement of the actuator rod 102 relative to the actuator block 104 and has no bearing on which of the actuator rod 102 and the actuator block 104 is fixed.

FIG. 3 is (a) an actuator rod 302 end view, (b) an actuator rod 302 side view, (c) an actuator block 304 section view through light sensors 320, (d) an actuator block 304 section view through ball bearings 316 and springs 318, and (d) an actuator block 304 side section view illustrating a schematic block diagram of an actuator apparatus 300 with precision ball bearings 316 and light sensors 320 in four rows spaced around an actuator rod 302 and opening 308 in an actuator block 304 with offset rod holes 306, according to various embodiments. The actuator rod 302, actuator block 304, rod holes 306, opening 308 in the actuator block 304, cavity 310 in the actuator rod 302, light assembly 312, block holes 314, ball bearings 316, springs 318, and light sensors 320 are substantially similar to the actuator rod 102, actuator block 104, rod holes 106, opening 108 in the actuator block 104, cavity 110 in the actuator rod 102, light assembly 112, block holes 114, ball bearings 116, spring mechanism 118, and light sensors 120 of the actuator apparatus 100 of FIGS. 1 and 2.

In the actuator apparatus 300 of FIG. 3, there are four sets of rod holes 306 spaced evenly around the actuator rod 302 and four sets of block holes 314 with a same spacing around the opening 308 of the actuator block 304. In the embodiment of FIG. 3, each set of rod holes 306 is offset from other rod holes 306, as depicted in FIG. 3(b), while the sets of block holes 314 and light sensors 320 are aligned, as depicted in FIG. 3(e), so that as the actuator block 304 moves with respect to the actuator rod 302, a rod hole 306 of a first set of rod holes 306 will pass a light sensor 320 at a different time than a rod hole 306 of a second set of rod holes 306 passes a different light sensor 320. Note that the cross section in FIG. 3(a) is figurative to show spacing of the rod holes 306 around the actuator rod 102 and are offset as depicted in FIG. 3(b).

In the embodiment of FIG. 3, the sets of rod holes 306 are offset in a pattern. In FIG. 3(b), the rod holes 306 of the actuator rod 302 that are in the center that are solid are on a first side of the actuator rod 302 and the rod holes 306 that are in the center of the actuator rod 302 that are dashed are on a side of the actuator rod 302 opposite the first side. Looking at the cross section of the actuator rod 302 in FIG. 3(a), if a rod hole 306 at the top passes a light sensor 320 at the top of the opening 308 of the actuator block 304 first, a rod hole 306 on the left of the cross section of FIG. 3(a) will pass a light sensor 320 on the left side of the opening 308 of the actuator block 304, then a rod hole 306 at the bottom of the actuator rod 302 will pass a light sensor 320 at the bottom of the opening 308 of the actuator block 304, and then a rod hole 306 on the right side will pass a light sensor 320 on the right side of the opening 308 of the actuator block 304. Spacing between offset rod holes 306 is represented in FIG. 3(b) as "W" and spacing between block holes 314 is then 4 W.

In other embodiments, the rod holes 306 are offset in a different pattern, such as two sets of rod holes 306 opposite each other are aligned while two other sets of rod holes 306 are aligned with each other but offset from the other two sets of aligned rod holes 306. One of skill in the art will recognize other ways to offset rod holes 306 for various purposes.

An advantage of offset rod holes 306 is increased precision because the rod holes 306 have to travel a shorter distance before a light sensor 320 detects a next passing of a rod hole 306 than the embodiment of FIGS. 1 and 2. In the embodiment of FIG. 3, if a rod hole 306 passes a first light sensor 320, three other rod holes 306 pass different light sensors 320 before alignment of next rod hole 306 passes the first light sensor 320 again. The more sets of rod holes 306 spaced around the actuator rod 302 the more precision that may be provided for movement of the actuator rod 302 with respect to the actuator block 304.

In another embodiment, with rod holes 306 offset as depicted in FIG. 3(b), direction of movement of the actuator rod 302 may be tracked by tracking a sequence, clockwise or counterclockwise, of when each light sensor 320 detects a rod hole 306. If the sequence is in a clockwise pattern, the actuator rod 302 is moving in a first direction with respect to the actuator block 304 and if the sequence is counterclockwise, the actuator rod 302 is moving in a second direction with respect to the actuator block 304. In some embodiments, a direction detector 124 determines direction of the actuator rod 302 with respect to the actuator block 304 using the sequence of when light sensors 320 detect passing of a rod hole 306.

FIG. 4 is (a) an actuator rod 402 end view, (b) an actuator rod 402 side view, (c) an actuator block 404 section view through light sensors 420, (d) an actuator block 404 section view through ball bearings 416 and springs 418, and (e) an actuator block 404 side section view illustrating a schematic block diagram of an actuator apparatus 400 with precision ball bearings 416 and light sensors 420 in four rows spaced around an actuator rod 402 and opening 308 in an actuator block 404 with offset block holes 414, according to various embodiments. The actuator rod 402, actuator block 404, rod holes 406, opening 408 in the actuator block 404, cavity 410 in the actuator rod 402, light assembly 412, block holes 414, ball bearings 416, springs 418, and light sensors 420 are substantially similar to the actuator rod 102, actuator block 104, rod holes 106, opening 108 in the actuator block 104, cavity 110 in the actuator rod 102, light assembly 112, block holes 114, ball bearings 116, spring mechanism 118, and light sensors 120 of the actuator apparatus 100 of FIGS. 1 and 2.

In FIG. 4, the block holes 414 are offset while the rod holes 406 are aligned in a direction of along a length of the actuator rod 402. In the embodiment of FIG. 4, the sets of block holes 414 are offset in a pattern. In FIG. 4(e), the block holes 414 of the actuator block 404 that are in the center that are solid are on a first side of the opening 408 of the actuator block 404 and the block holes 414 that are in the center of the opening 408 of the actuator block 404 in a same row and that are dashed are on a side of the opening 408 opposite the first side, as depicted in FIGS. 4(c) and 4(d).

As with FIG. 3, looking at the cross section of the actuator rod 402 in FIG. 4(a), if a rod hole 406 at the top passes a light sensor 420 at the top of the opening 408 of the actuator block 404 first, a rod hole 406 on the left of the cross section of FIG. 4(a) will pass a light sensor 420 on the left side of the opening 408 of the actuator block 404, then a rod hole 406 at the bottom of the actuator rod 402 will pass a light sensor 420 at the bottom of the opening 408 of the actuator block 404, and then a rod hole 406 on the right side will pass a light sensor 420 on the right side of the opening 408 of the actuator block 404. Spacing between offset block holes 414 is represented in FIG. 4(e) as "W" and spacing between rod holes 406 is then 4 W.

Offset of the block holes 414 as in FIG. 4 has a same ability to increase precision as offsetting the rod hole 306 as in FIG. 3. Again, direction of the actuator rod 402 can be tracked by tracking a sequence of detection of rod holes 406 by the light sensors 420. The cross sections of FIGS. 4(c) and 4(d) are figurative to show spacing of the light sensors 420, ball bearings 416, and spring mechanisms 418 around the opening 408 of the actuator block 404 and are not intended to be accurate cross sections.

FIG. 5 is (a) an actuator rod 502 end view, and (b) an actuator block 504 section view through light sensors 520 illustrating a schematic block diagram of an actuator apparatus 500 with precision bearings and light sensors 520 in three rows spaced around an actuator rod 502 and opening 508 in an actuator block 504, according to various embodiments. FIG. 5 illustrates three rows of sets of rod holes 506 instead of four rows, as in FIGS. 3 and 4. The actuator apparatus 500 of FIG. 5 may have less precision of movement tracking than the actuator apparatuses 300, 400 of FIGS. 3 and 4. Having five rows would increase precision of movement tracking.

Figure 6:
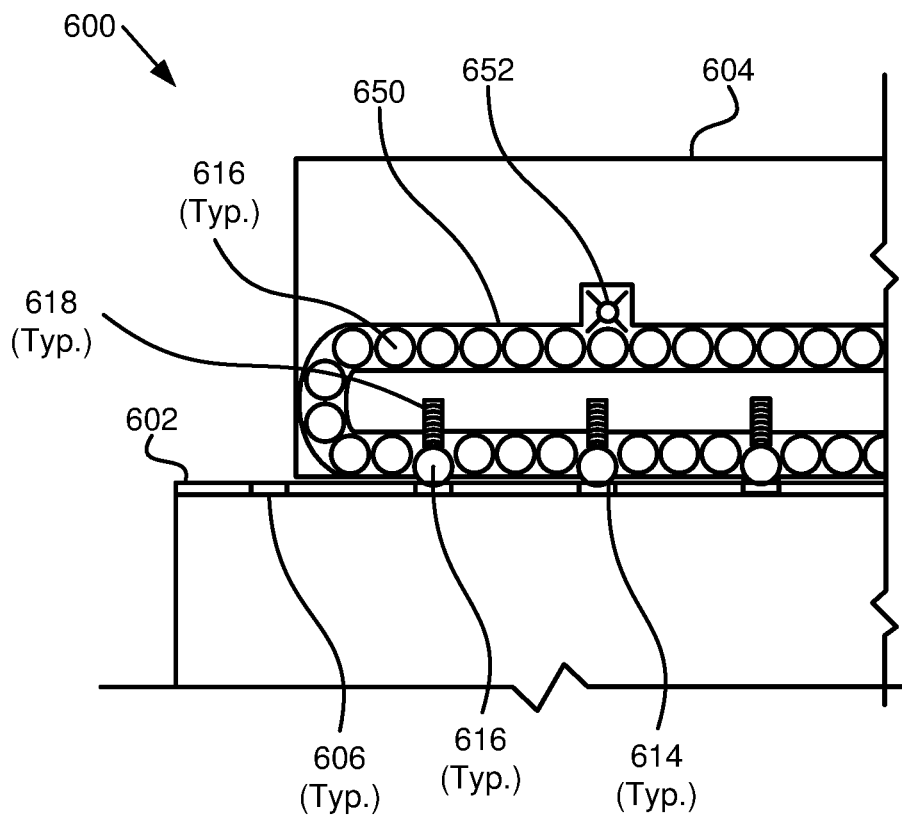
FIG. 6 is a partial section view of a schematic block diagram of an actuator apparatus with replaceable ball bearings, according to various embodiments.

FIG. 6 is a partial section view of a schematic block diagram of an actuator apparatus 600 with replaceable ball bearings 616, according to various embodiments. The actuator apparatus 600 includes an actuator rod 602 and an actuator block 604, which are substantially similar to other actuator rods 102, 302, 402, 502 and actuator blocks 104, 304, 404, 504 described herein. Where each block hole (e.g., 114, 314, 414) has a single ball bearing (e.g., 116, 316, 416), the ball bearings may develop a flat spot or may otherwise wear unevenly. The reciprocating ball bearings 616 offer a solution to prevent flats on the ball surface offer high use of the actuator apparatus 600. The design of the actuator apparatus 600 of FIG. 6 incorporates a unique spring actuated force against each ball bearing 616 to be positioned into a counter-sunk block hole 614 of the actuator block 604 and rod holes 606 along the actuator rod 602 as the ball bearings 616 move front block hole 614 to block hole 614.

The actuator apparatus 600 of FIG. 6 includes a bearing track 650 and bearing mover assembly 652 that pushes ball bearings 616 through the bearing track 650 so that a ball bearing 616 over block hole 614 and under a spring mechanism 618 that is moving in and out of rod holes 606 is moved aside and replaced with another ball bearing 616 on a regular basis. In some embodiments, the bearing mover assembly 652 moves ball bearings 616 continuously. In other embodiments, the bearing mover assembly 652 moves ball bearings 616 on a periodic basis. In other embodiments, the bearing mover assembly 652 moves ball bearings 616 while the actuator rod 602 is not moving with respect to the actuator block 604.

The actuator apparatus 600 of FIG. 6 is one possible design. Other actuator apparatuses include bearing replacement systems that are different. In some examples, bearing tracks and bearing mover assemblies are for fewer block hole locations. In other embodiments, the bearing track 650 includes less ball bearings 616 and the bearing mover assembly 652 includes a mechanism to advance ball bearings 616 other than each ball bearing 616 pushing on another ball bearing 616. One of skill in the art will recognize other ways to replace ball bearings 616.

Figure 7:
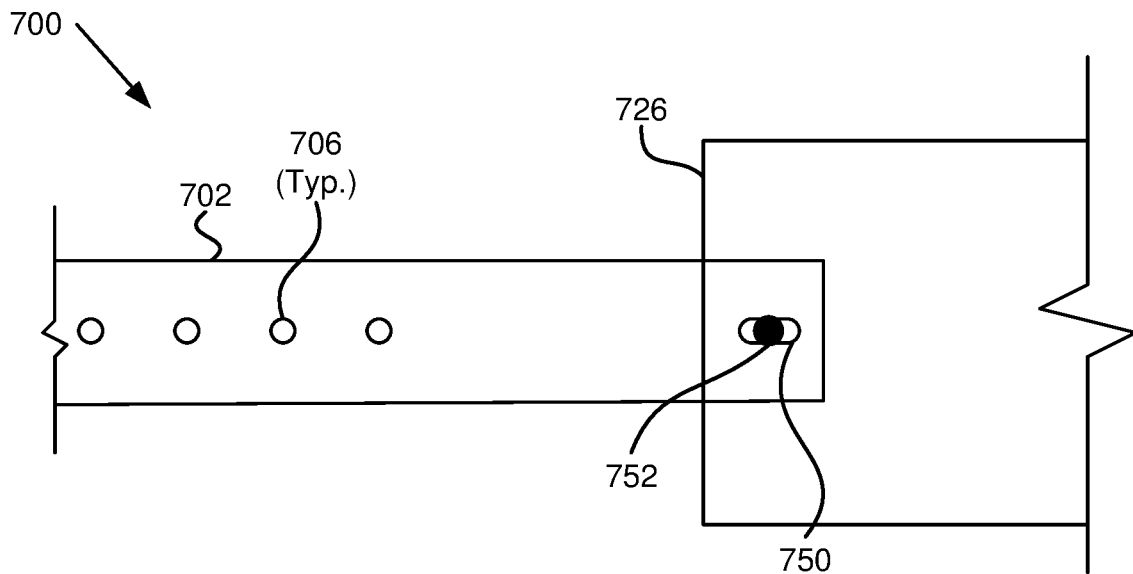
FIG. 7 is a schematic block diagram illustrating an actuator rod connected to a mover apparatus via a slot that allows for discrete movement of the actuator rod with respect to the actuator apparatus, according to various embodiments.

FIG. 7 is a schematic block diagram illustrating an actuator rod 702 connected to a mover apparatus 726 via a slot 750 that allows for discrete movement of the actuator rod 702 with respect to the actuator apparatus (not shown), according to various embodiments. In some embodiments, it is advantageous for the actuator rod 702 to snap forward to a next position of alignment of rod holes 706 and ball bearings (not shown but similar to the ball bearings 116, 316, 416, 616 described herein) so that as the actuator rod 702 moves with respect to the actuator block (not shown but similar to the actuator blocks 104, 304, 404, 504, 604 described herein) such that alignment between rod holes 706 and ball bearings is maintained before snapping to a next alignment of rod holes 706 and ball bearings.

The actuator apparatus 700 provides a mechanism for snapping between alignment positions by having a slot 750 with a pin 752 free to move back and forth within the slot 750. Length of the slot is based on spacing between the rod holes 706 such that as the mover apparatus 726 pushes or pulls the actuator rod 702, an end of the slot 750 contacts the pin 752 and motivates the actuator rod to move and snap to a next alignment position as the pin 752 moves within the slot 750. The actuator apparatus 700 of FIG. 7 includes one possible implementation that provides a more discrete movement of the actuator rod 702 with respect to an actuator block. One of skill in the art will recognize other designs appropriate for an actuator rod and actuator block configuration.

Figure 8:
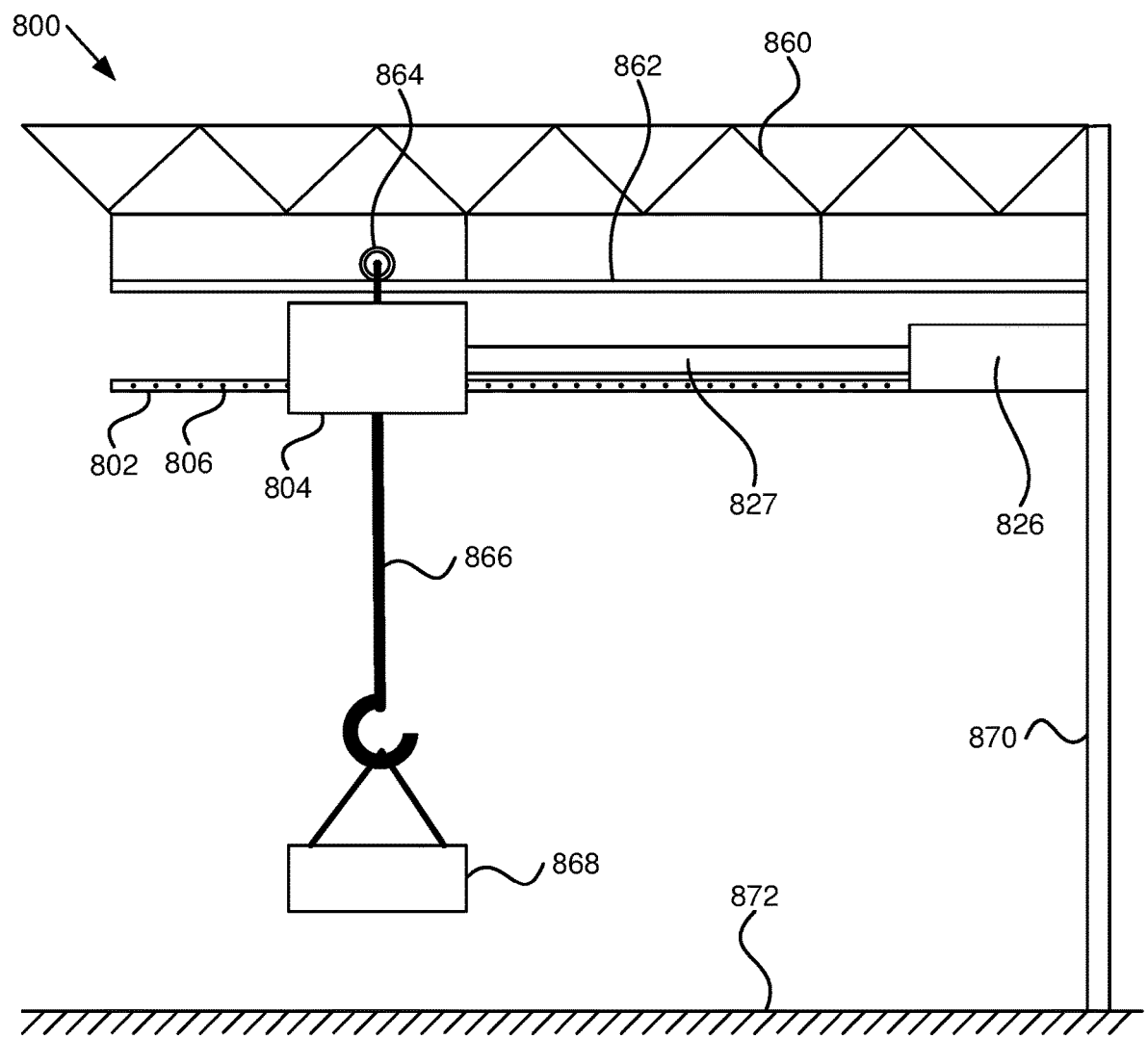
FIG. 8 is a schematic block diagram illustrating an application of an actuator apparatus with a fixed actuator rod and moving actuator block, according to various embodiments.

FIG. 8 is a schematic block diagram illustrating an application of an actuator apparatus 800 with a fixed actuator rod 802 and moving actuator block 804, according to various embodiments. The actuator apparatus 800 of FIG. 8 is one implementation and one of skill in the art will recognize other applications of the actuator apparatuses 100, 300, 400, 500, 600, 700 described herein.

The actuator block 804 is suspended from a track 862 connected to roof trusses 860 where the actuator block 804 moves via a wheel 864. A load 868 is suspended from the actuator block 804 via a cable and hook assembly 866. A mover apparatus 826 anchored to a wall 870 moves the actuator block 804 via a mover device 827, such as a rod from a pneumatic press, a worm gear rotated by a motor, a chain and pully system, etc. The actuator rod 802 is fixed and includes rod holes 806 spaced with enough precision to accurately move the load 868 to a particular position over a floor 872 before the cable and hook assembly 866 lowers the load 868.

Figure 9:
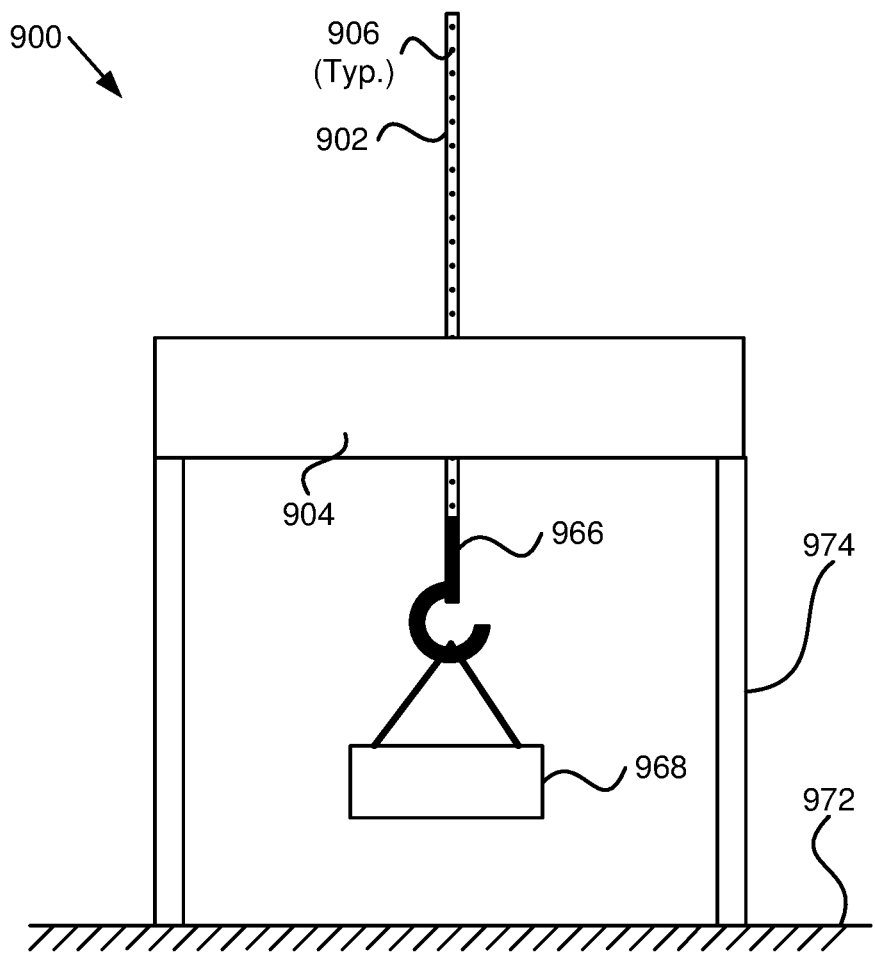
FIG. 9 is a schematic block diagram illustrating an application of an actuator apparatus with a fixed actuator block and moving actuator rod, according to various embodiments.

FIG. 9 is a schematic block diagram illustrating an application of an actuator apparatus 900 with a fixed actuator block 904 and moving actuator rod 902, according to various embodiments. The actuator rod 902 is connected to a hook 966 connected to a load 968 above a floor 972. The actuator block 904 is suspended with supports 974 above the floor 972. The actuator rod 902 includes rod holes 906 spaced sufficiently apart to provide adequate precision for keeping track of height of the load 968 above the floor. In the embodiment, a mover apparatus (e.g., 126) is internal to the actuator block 904 and moves the actuator rod 902. In other embodiments, an external mover apparatus is connected to the actuator rod 902. While the examples of FIGS. 8 and 9 include simple mechanisms for supporting a load, other more complex movers, robotics, etc. may be used in a process where an actuator rod and actuator block are used for precision movement.

FIG. 10A is a schematic block diagram illustrating a ball bearing and spring mechanism 1000, according to various embodiments. The ball bearing 116 is in a block hole 114 of an actuator block 104 that is slightly narrower than a diameter of the ball bearing 116 to retain the ball bearing 116 when an actuator rod 102 is not present. The ball bearing 116 is resting in a rod hole 106 of an actuator rod 102. The spring mechanism 118 presses on the ball bearing 116 and is depicted in a pocket 1002 of the actuator block 104. In some embodiments, the spring mechanism 118 includes a linear spring. In other embodiments, the spring mechanism 118 includes a spring within a sleeve, a capped sleeve, etc. to prevent the spring mechanism 118 from extending past a particular point, which would be useful for the actuator apparatus 600 of FIG. 6 with a bearing track 650. The block hole 114 is depicted as sloped on both sides, which would be appropriate for a bearing replacement system where a bearing track 650 includes other ball bearings 116 that push out the current ball bearing 116 while another ball bearing 116 moves over the block hole 114. The spring mechanism 118 is partially within a compartment 1002 that provides a backstop for the spring mechanism 118.

FIG. 10B is a schematic block diagram illustrating a ball bearing and spring mechanism 1001 with an alternate to using a ball bearing, according to various embodiments. The ball bearing and spring mechanism 1001 of FIG. 10B includes a spring 118 pushing on a cap 1004 shaped with a rounded end 1006 and cylindrical portion 1008 to accommodate an end of the spring 118. A collar section 1010 flairs out from the cylindrical portion 1008 to keep the cap 1004 retained in the block hole 114. The cap 1004 is long enough to extend into a rod hole 106. The rounded end 1006 provides ease in pushing the actuator rod 102 past the cap 1004. The rounded end 1006, in some embodiments, is spherical shaped. In other embodiments, the rounded end 1006 is rounded in a direction of movement of the actuator rod 102 with respect to the actuator block 104, such as a portion of a side of a cylinder. In such embodiments, the block holes 114 may be rectangular. As used herein, use of the term ball bearing (e.g. 116, 316, 416, 616) refers to a round ball bearing, to a ball bearing and spring mechanism 1001 as depicted in FIG. 10B, or other similar design with a rounded end that protrudes into an aligned rod hole (e.g. 106, 306, 406, 506, 606, 706, 806, 906) and is pushed toward an actuator rod (e.g. 102, 302, 402, 502, 602, 702, 802, 902) by a spring force.

Figure 11:
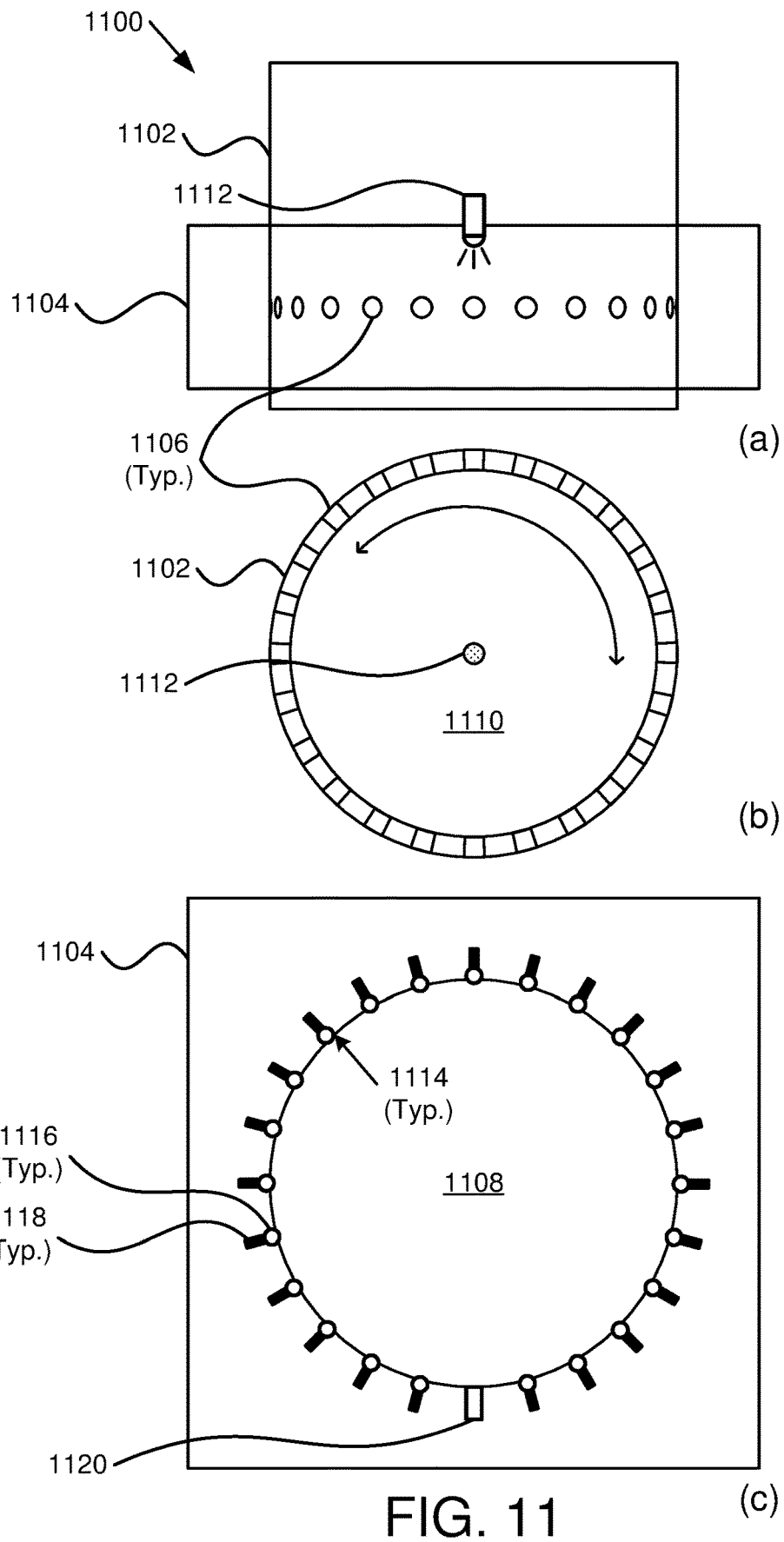
FIG. 11 is (a) a side transparent view of an actuator apparatus, (b) is a cross section view of an actuator rod, and (c) a cross section view of an actuator block for a rotary actuator apparatus, according to various embodiments.

FIG. 11 is (a) a side transparent view of an actuator apparatus, (b) is a cross section view of an actuator rod 1102, and (c) a cross section view of an actuator block 1104 for a rotary actuator apparatus 1100, according to various embodiments. An actuator rod 1102 rotates in an opening 1108 of an actuator block 1104 instead of being pushed through the actuator block 1104 as depicted in FIGS. 1-9. Rod holes 1106 are spaced around a circumference of the actuator rod 1102 and block holes 1114, ball bearings 1116 and associated springs 1118 are spaced around a circumference of the opening 1108 of the actuator block 1104. A light assembly 1112 is positioned the cavity 1110 of the actuator rod 1102 to shine through the rod holes 1106 and a light sensor 1120 is in a block hole 1114. While the rotary actuator apparatus 1100 of FIG. 11 depicts a single set of rod holes 1106 and block holes 1114, other embodiments may include additional sets of rod holes 1106 and block holes 1114 spaced above and/or below the rod holes 1106 of FIG. 11(a). The various descriptions of actuator apparatuses 100, 300, 400, 500, 600, 700, and spring mechanisms 1000, 1001 are applicable to the rotary actuator apparatus 1100 of FIG. 11.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    an actuator rod comprising an interior cavity and a set of rod holes, each rod hole of the set of rod holes extending through the actuator rod to the cavity, the set of rod holes positioned in a straight line;
    a light assembly positioned to light the cavity; and
    an actuator block comprising:
        an opening extending through the actuator block sized to conform to an outer surface of the actuator rod;
        a set of block holes in the opening, wherein spacing between the block holes matches spacing between the rod holes;
        a light sensor positioned in a block hole of the set of block holes to sense light coming through a rod hole aligned with the block hole; and
        a ball bearing for each block hole of the set of block holes without a light sensor and extending partially through the corresponding block hole.

2. The apparatus of claim 1, wherein the set of rod holes comprises a first set of rod holes, and wherein the set of block holes comprise a first set of block holes and further comprising:
    one or more additional sets of rod holes, wherein the first set of rod holes and the one or more additional sets of rod holes comprise a plurality of sets of rod holes and are spaced equidistant around the actuator rod;
    one or more additional sets of block holes, wherein the first set of block holes and the one or more additional sets of block holes comprise a plurality of sets of block holes and are spaced equidistant around the opening to align with the sets of rod holes of the plurality of sets of rod holes; and
    a light sensor for each of the additional sets of block holes, each positioned in a block hole,
    wherein each block hole of the one or more additional sets of block holes not comprising a light sensor comprises a ball bearing.

3. The apparatus of claim 2, wherein one of:
    the rod holes of each of the one or more additional sets of rod holes is offset from the rod holes of the first set of rod holes and from each other in a direction along the first set of rod holes and each block hole of the one or more additional sets of block holes aligns with a block hole of the first set of block holes in a plane running perpendicular to a direction of the first set of block holes; or
    the block holes of the one or more additional sets of block holes is offset from the block holes of the first set of block holes and from each other in a direction of the first set of block holes and each rod hole of the one or more additional sets of rod holes aligns with a rod hole of the first set of rod holes in a plane running perpendicular to a direction of the first set of rod holes,
    such that as the actuator block moves with respect to the actuator rod, rod holes of each of the plurality of sets of rod holes align with block holes at different times.

4. The apparatus of claim 2, wherein the rod holes of each of the one or more additional sets of rod holes align with each other and the first set of rod holes in a direction of a plane running perpendicular to a direction along the first set of rod holes and the block holes of each of the one or more additional sets of block holes align with each other and block holes of the first set of block holes in a direction of a plane running perpendicular to a direction along the first set of block holes such that the rod holes of the first set of rod holes and the one or more additional sets of rod holes align with block holes of the first set of block holes and each of the one or more additional sets of block holes at a same time.

5. The apparatus of claim 1, further comprising a spring mechanism behind each ball bearing pushing the ball bearing toward the opening, wherein as the actuator block moves relative to the actuator rod and rod holes align with block holes, each ball bearing extends into a rod hole.

6. The apparatus of claim 1, further comprising a hole counter module configured to increment or decrement a hole counter in response to the light sensor sensing light during alignment of a rod hole with a block hole.

7. The apparatus of claim 6, further comprising a direction detector configured to determine a direction of movement of the actuator block with respect to the actuator rod, wherein the hole counter module increments the hole counter in response to the light sensor sensing light and the direction detector determining that the actuator block is moving in a first direction with respect to the actuator rod and the hole counter module decrements the hole counter in response to the light sensor sensing light and the direction detector determining that the actuator block is moving in a second direction with respect to the actuator rod, the second direction opposite the first direction.

8. The apparatus of claim 1, further comprising a mover apparatus configured to move the actuator block with respect to the actuator rod in a direction such that lines connecting each rod hole of the set of rod holes maintain alignment with lines connecting each block hole of the set of block holes.

9. The apparatus of claim 8, wherein one of:
    the mover apparatus moves the actuator block along the actuator rod; and
    the mover apparatus moves the actuator rod through the actuator block.

10. The apparatus of claim 9, wherein the mover apparatus moves the actuator block along the actuator rod and wherein the actuator rod is in a fixed position.

11. The apparatus of claim 8, wherein the mover apparatus comprises:
    an internal mover within the actuator block configured to engage the actuator rod;
    a separate mover component external to the actuator block configured to move the actuator block with respect to the actuator rod; and/or
    a linear motor configured to move the actuator block with respect to the actuator rod magnetically.

12. The apparatus of claim 8, wherein the mover apparatus is configured to maintain the actuator rod in alignment with the actuator block such that lines connecting each rod hole of the set of rod holes maintain alignment with lines connecting each block hole of the set of block holes.

13. The apparatus of claim 8, wherein the mover apparatus comprises free movement in a direction of movement of the actuator block with respect to the actuator rod, wherein the free movement enables ball bearings positioned in block holes without a sensor to snap forward from one set of rod holes to another set of rod holes as the mover apparatus advances the actuator block with respect to the actuator rod.

14. The apparatus of claim 1, wherein a shape of the actuator rod and a shape of the opening of the actuator block maintain the actuator rod in alignment with the actuator block such that lines connecting each rod hole of the set of rod holes maintain alignment with lines connecting each block hole of the set of block holes.

15. The apparatus of claim 1, wherein the actuator rod is linear and the rod holes run in a direction along a length of the actuator rod and the actuator block moves with respect to the actuator rod in a direction along the length of the actuator rod.

16. The apparatus of claim 1, wherein the actuator rod is round and the rod holes run in a direction around a circumference of the actuator rod and the actuator block rotates with respect to the actuator rod in a direction around the circumference of the actuator rod.

17. The apparatus of claim 1, further comprising:
a bearing track within the actuator block between block holes, wherein the actuator block comprises ball bearings within the bearing track in excess of the block holes of the set of block holes; and
a bearing mover configured to move the ball bearings in the bearing track such that, for each block hole in the actuator block, a ball bearing in a block hole is moved out from over the block hole of the block hole and another ball bearing is moved into place over the block hole by action of the bearing mover.

18. A system comprising:
an actuator rod comprising an interior cavity and a set of rod holes, each rod hole of the set of rod holes extending through the actuator rod to the cavity, the set of rod holes positioned in a straight line;
a light assembly positioned to light the cavity;
an actuator block comprising:
an opening extending through the actuator block sized to conform to an outer surface of the actuator rod;
a set of block holes in the opening, wherein spacing between the block holes matches spacing between the rod holes;
a light sensor positioned in a block hole of the set of block holes to sense light coming through a rod hole aligned with the block hole;
a ball bearing for each block hole of the set of block holes without a light sensor and extending partially through the corresponding block hole; and
a spring mechanism behind each ball bearing pushing the ball bearing toward the opening, wherein as the actuator block moves relative to the actuator rod and rod holes align with block holes, each ball bearing extends into a rod hole;
a hole counter module configured to increment or decrement a hole counter in response to the light sensor sensing light during alignment of a rod hole with a block hole;
a mover apparatus configured to move the actuator block with respect to the actuator rod in a direction such that lines connecting each rod hole of the set of rod holes maintain alignment with lines connecting each block hole of the set of block holes; and a direction detector configured to determine a direction of movement of the actuator block with respect to the actuator rod, wherein the hole counter module increments the hole counter in response to the light sensor sensing light and the direction detector determining that the actuator block is moving in a first direction with respect to the actuator rod and the hole counter module decrements the hole counter in response to the light sensor sensing light and the direction detector determining that the actuator block is moving in a second direction with respect to the actuator rod, the second direction opposite the first direction.

19. An apparatus comprising:
an actuator rod comprising an interior cavity and a plurality of sets of rod holes, each rod hole extending through the actuator rod to the cavity, each set of rod holes positioned in a straight line along a length of the actuator rod, the sets of rod holes spaced evenly around a circumference of the actuator rod;
a light assembly positioned to light the cavity; and
an actuator block comprising:
an opening extending through the actuator block sized to conform to an outer surface of the actuator rod;
a plurality of sets of block holes in the opening, wherein spacing between the block holes matches spacing between the rod holes, each set of block holes aligned with a set of rod holes in a direction along the length of the actuator rod;
a plurality of light sensors comprising a light sensor for each set of block holes, the light sensor for a set of block holes positioned in a block hole of the set of block holes to sense light coming through a rod hole aligned with the block hole;
a ball bearing for each block hole of each of the sets of block holes without a light sensor and extending partially through the corresponding block hole; and
a spring mechanism behind each ball bearing pushing the ball bearing toward the opening, wherein as the actuator block moves relative to the actuator rod and rod holes align with block holes, each ball bearing extends into a rod hole; and
a hole counter module configured to increment or decrement a hole counter in response to a light sensor of the plurality of light sensors sensing light during alignment of a rod hole with a block hole.

20. The apparatus of claim 19, wherein one of:
each set of rod holes of the plurality of sets of rod holes is offset from other sets of rod holes of the plurality of rod holes in a direction along the length of the actuator rod and each set of block holes of the plurality of sets of block holes aligns with other sets of block holes of the plurality of block holes in a direction around a circumference of the actuator rod; or
each set of block holes of the plurality of sets of block holes is offset from other sets of block holes of the plurality of block holes in a direction along the length of the actuator rod and each set of rod holes of the plurality of sets of rod holes aligns with other sets of rod holes of the plurality of rod holes in a direction around a circumference of the actuator rod,
such that as the actuator block moves with respect to the actuator rod, rod holes of a first set of rod holes of the plurality of rod holes align with corresponding block holes at a different time than rod holes of other sets of rod holes align with corresponding block holes.

* * * * *